US012602591B2

(12) United States Patent
Gulcehre et al.

(10) Patent No.: US 12,602,591 B2
(45) Date of Patent: Apr. 14, 2026

(54) TRAINING REINFORCEMENT LEARNING AGENTS USING AUGMENTED TEMPORAL DIFFERENCE LEARNING

(71) Applicant: GDM Holding LLC, Mountain View, CA (US)

(72) Inventors: Caglar Gulcehre, London (GB); Razvan Pascanu, Letchworth Garden City (GB); Sergio Gomez, London (GB)

(73) Assignee: GDM Holding LLC, Mountain View, CA (US)

( * ) Notice: Subject to any disclaimer, the term of this patent is extended or adjusted under 35 U.S.C. 154(b) by 483 days.

(21) Appl. No.: 18/029,979

(22) PCT Filed: Oct. 1, 2021

(86) PCT No.: PCT/EP2021/077182
§ 371 (c)(1),
(2) Date: Apr. 3, 2023

(87) PCT Pub. No.: WO2022/069747
PCT Pub. Date: Apr. 7, 2022

(65) Prior Publication Data
US 2023/0376780 A1 Nov. 23, 2023

Related U.S. Application Data

(60) Provisional application No. 63/087,156, filed on Oct. 2, 2020.

(51) Int. Cl.
*G06N 3/092* (2023.01)
*G06N 3/0442* (2023.01)

(52) U.S. Cl.
CPC ........... *G06N 3/092* (2023.01); *G06N 3/0442* (2023.01)

(58) Field of Classification Search
None
See application file for complete search history.

(56) References Cited

U.S. PATENT DOCUMENTS

2017/0024643 A1 1/2017 Lillicrap et al.
2019/0250568 A1* 8/2019 Li .......................... G06N 20/00
(Continued)

OTHER PUBLICATIONS

Achiam et al., "Towards characterizing divergence in deep Q-learning," CoRR, submitted on Mar. 21, 2019, arXiv:1903.08894v1, 22 pages.
(Continued)

*Primary Examiner* — Clifford Hilaire
(74) *Attorney, Agent, or Firm* — Fish & Richardson P.C.

(57) ABSTRACT

Methods, systems, and apparatus, including computer programs encoded on computer storage media, for training a neural network used to select actions performed by an agent interacting with an environment by performing actions that cause the environment to transition states. One of the methods includes maintaining a replay memory storing a plurality of transitions; selecting a plurality of transitions from the replay memory; and training the neural network on the plurality of transitions, comprising, for each transition: generating an initial Q value for the transition; determining a scaled Q value for the transition; determining a scaled temporal difference learning target for the transition; determining an error between the scaled temporal difference learning target and the scaled Q value; determining an update to the current values of the Q network parameters; and determining an update to the current value of the scaling term.

20 Claims, 6 Drawing Sheets

(56) References Cited

U.S. PATENT DOCUMENTS

| | | | | |
|---|---|---|---|---|
| 2019/0272465 | A1 | 9/2019 | Kimura et al. | |
| 2019/0303764 | A1* | 10/2019 | Uria-Martínez | G06N 3/084 |
| 2020/0327411 | A1* | 10/2020 | Shi | G06N 3/088 |
| 2023/0273265 | A1* | 8/2023 | Li | G01R 31/392 |
| | | | | 702/63 |

OTHER PUBLICATIONS

Agarwal et al., "An optimistic perspective on offline reinforcement learning," CoRR, submitted on Jun. 22, 2020, arXiv:1907.04543v4, 20 pages.
Agarwal et al., "Striving for simplicity in off-policy deep reinforcement learning," CoRR, submitted on Jul. 10, 2019, arXiv:1907.04543v1, 17 pages.
Andrychowicz et al., "Learning dexterous in-hand manipulation," CoRR, submitted on Jan. 18, 2019, arXiv:1808.00177v5, 27 pages.
Beattie et al., "Deepmind lab," CoRR, submitted on Dec. 13, 2016, arXiv:1612.03801v2, 11 pages.
Bellemare et al., "A distributional perspective on reinforcement learning," CoRR, submitted on Jul. 21, 2017, arXiv:1707.06887v1, 19 pages.
Bellemare et al., "The arcade learning environment: An evaluation platform for general agents," CoRR, submitted on Jun. 21, 2013, arXiv:1207.4708v2, 27 pages.
Berner et al., "Dota 2 with large scale deep reinforcement learning," CoRR, submitted on Dec. 13, 2019, arXiv:1912.06680v1, 66 pages.
Bradtke et al., "Linear least-squares algorithms for temporal difference learning," Machine Learning, Mar. 1996, 22:33-57.
Burges et al., "Learning to rank using gradient descent," In Proceedings of the 22nd international conference on Machine learning, Aug. 7, 2005, p. 89-96.
Chen et al., "Ranking measures and loss functions in learning to rank," In Advances in Neural Information Processing Systems, 2009, p. 315-323.
Ernst et al., "Tree-based batch mode reinforcement learning," Journal of Machine Learning Research, 2005, 6:503-556.
Fu et al., "D4RL: Datasets for deep data-driven reinforcement learning," CoRR, submitted on Feb. 6, 2021, arXiv:2004.07219v4, 19 pages.
Fujimoto et al., "Addressing function approximation error in actor-critic methods," CoRR, submitted on Oct. 22, 2018, arXiv:1802.09477v3, 15 pages.
Fujimoto et al., "Benchmarking batch deep reinforcement learning algorithms," CoRR, submitted on Oct. 3, 2019, arXiv:1910.01708v1, 13 pages.
Fujimoto et al., "Off-policy deep reinforcement learning without exploration," CoRR, submitted on Aug. 10, 2019, arXiv:1812.02900v3, 23 pages.
Gabriel et al., "Distributed distributional deterministic policy gradients," CoRR, submitted on Apr. 23, 2018, arXiv:1804.08617v1, 16 pages.
Gu et al., "Improving the gating mechanism of recurrent neural networks," CoRR, submitted on Jun. 18, 2020, arXiv:1910.09890v2, 19 pages.
Gulcehre et al., "Regularized Behavior Value Estimation," CoRR, submitted on Mar. 17, 2021, arXiv:2103.09575v1, 28 pages.
Gulcehre et al., "RL unplugged: Benchmarks for offline reinforcement learning," CoRR, submitted on Feb. 12, 2021, arXiv:2006.13888v4, 21 pages.
Haarnoja et al., "Soft actor-critic: Off-policy maximum entropy deep reinforcement learning with a stochastic actor," CoRR, submitted on Aug. 8, 2018, arXiv:1801.01290v2, 14 pages.
Hasselt et al., "Deep reinforcement learning and the deadly triad," CoRR, submitted on Dec. 6, 2018, arXiv:1812.02648v1, 13 pages.
Hasselt et al., "Deep reinforcement learning with double q-learning," In Proceedings of the AAAI conference on artificial intelligence, Mar. 2, 2016, 7 pages.

Hasselt, "Double Q-learning," In Advances in neural information processing systems, 2010, p. 2613-2621.
Hessel et al., "Rainbow: Combining improvements in deep reinforcement learning," CoRR, submitted on Oct. 6, 2017, arXiv:1710.02298v1, 14 pages.
Hoffman et al., "Acme: A research framework for distributed reinforcement learning," CoRR, submitted on Sep. 20, 2022, arXiv:2006.00979v2, 36 pages.
International Search Report and Written Opinion in Appln. No. PCT/EP2021/077182, mailed on Mar. 2, 2022, 13 pages.
Kamyar et al., "EMaQ: Expected-Max Q-Learning operator for simple yet effective offline and online RL," CoRR, submitted on Jan. 13, 2021, arXiv:2007.11091v2, 28 pages.
Kapturowski et al., "Recurrent experience replay in distributed reinforcement learning," In International Conference on Learning Representations, 2019, 19 pages.
Kingma et al., "Adam: A method for stochastic optimization," CoRR, submitted on Jan. 30, 2017, arXiv: 1412.6980v9, 15 pages.
Kumar et al., "Conservative q-learning for offline reinforcement learning," CoRR, submitted on Aug. 19, 2020, arXiv:2006.04779v3, 31 pages.
Kumar et al., "Stabilizing off-policy Q-learning via bootstrapping error reduction," CoRR, submitted on Nov. 25, 2019, arXiv:1906.00949v2, 19 pages.
Lagoudakis et al., "Least-squares policy iteration," The Journal of Machine Learning Research, Dec. 1, 2003, 4:1107-49.
Lange et al., "Batch reinforcement learning," In Reinforcement learning: State-of-the-art, Mar. 5, 2012, p. 45-73.
Levine et al., "Offline reinforcement learning: Tutorial, review, and perspectives on open problems," CoRR, submitted on Nov. 1, 2020, arXiv:2005.01643v3, 43 pages.
Lillicrap et al., "Continuous control with deep reinforcement learning," CoRR, submitted on Jul. 5, 2019, arXiv:1509.02971v6, 14 pages.
Lin et al., "Ranking policy gradient," CoRR, submitted on Nov. 26, 2019, arXiv:1906.09674v3, 41 pages.
Mnih et al., "Human-level control through deep reinforcement learning," Nature, Feb. 2015, 518(7540):529-33.
Osband et al., "Behaviour suite for reinforcement learning," CoRR, submitted on Feb. 14, 2020, arXiv:1908.03568v3, 19 pages.
Peters et al., "Reinforcement learning of motor skills with policy gradients," Neural Networks, May 1, 2008, 21(4):682-97.
Pohlen et al., "Observe and look further: Achieving consistent performance on Atari," CoRR, submitted on May 29, 2018, arXiv:1805.11593v1, 19 pages.
Riedmiller, "Neural fitted Q iteration-first experiences with a data efficient neural reinforcement learning method," In Machine Learning: ECML 2005: 16th European Conference on Machine Learning, Porto, Portugal, Oct. 3-7, 2005, Proceedings 16, 2005, p. 317-328.
On-line Q-learning using connectionist systems, Cambridge, UK: University of Cambridge, Department of Engineering, Sep. 1994, 22 pages (partial).
Schaul et al., "Prioritized experience replay," CoRR, submitted on Feb. 25, 2016, arXiv:1511.05952v4, 21 pages.
Schmidhuber, "A possibility for implementing curiosity and boredom in model-building neural controllers," In Proceedings of the international conference on simulation of adaptive behavior: From animals to animats, 1991, p. 222-227.
Seijen et al., "A theoretical and empirical analysis of Expected Sarsa," In 2009 IEEE symposium on adaptive dynamic programming and reinforcement learning, Mar. 30, 2009, p. 177-184.
Siegel et al., "Keep doing what worked: Behavior modelling priors for offline reinforcement learning," In International Conference on Learning Representations, 2020, 21 pages.
Silver et al., "Mastering the game of go without human knowledge," Nature, Oct. 2017, 550(7676):354-9.
Su et al., "Conqur: Mitigating delusional bias in deep q-learning," CoRR, submitted on Feb. 27, 2020, arXiv:2002.12399v1, 21 pages.
Vinyals et al., "Grandmaster level in starcraft II using multi-agent reinforcement learning," Nature, Oct. 30, 2019, 575(7782):350-354.
Wang et al., "Critic regularized regression," Advances in Neural Information Processing Systems, 2020, 33:7768-78.

(56)                    References Cited

OTHER PUBLICATIONS

Williams, "Simple statistical gradient-following algorithms for connectionist reinforcement learning, " Machine Learning, May 1992, 8:229-56.

* cited by examiner

300

```
┌─────────────────────────────────────────┐
│   Maintain a replay memory storing       │
│   a plurality of transitions      302    │
└─────────────────────────────────────────┘
                    │
                    ▼
┌─────────────────────────────────────────┐
│   Select a plurality of transitions      │
│                                  304     │
└─────────────────────────────────────────┘
```

For each transition:

```
┌─────────────────────────────────────────┐
│   Generate an initial Q value for the    │
│   transition                      306    │
└─────────────────────────────────────────┘
                    │
                    ▼
┌─────────────────────────────────────────┐
│   Determine a scaled Q value for the     │
│   transition                      308    │
└─────────────────────────────────────────┘
                    │
                    ▼
┌─────────────────────────────────────────┐
│   Determine a scaled temporal difference │
│   learning target for the transition     │
│                                  310     │
└─────────────────────────────────────────┘
                    │
                    ▼
┌─────────────────────────────────────────┐
│   Determine an error between the scaled  │
│   temporal difference learning target    │
│   and the scaled Q value          312    │
└─────────────────────────────────────────┘
                    │
                    ▼
┌─────────────────────────────────────────┐
│   Determine an update to the current     │
│   values of the Q network parameters     │
│                                  314     │
└─────────────────────────────────────────┘
                    │
                    ▼
┌─────────────────────────────────────────┐
│   Determine an update to the current     │
│   value of the scaling term       316    │
└─────────────────────────────────────────┘
```

FIG. 3

TRAINING REINFORCEMENT LEARNING AGENTS USING AUGMENTED TEMPORAL DIFFERENCE LEARNING

CROSS-REFERENCE TO RELATED APPLICATIONS

This application is a National Stage Application under 35 U.S.C. § 371 and claims the benefit of International Application No. PCT/EP2021/077182, filed Oct. 1, 2021, which claims priority to U.S. Provisional Application No. 63/087, 156, filed on Oct. 2, 2020. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that controls an agent using a control neural network system to perform one or more tasks.

In general, one innovative aspect of the subject matter described in this specification can be embodied in a method for training a Q neural network having a plurality of Q network parameters and used to select actions performed by a reinforcement learning agent interacting with an environment by performing actions that cause the environment to transition states, the method comprising: maintaining a replay memory, the replay memory storing a plurality of transitions generated as a result of the reinforcement learning agent interacting with the environment, each transition comprising a respective current observation characterizing a respective current state of the environment, a respective current action performed by the agent in response to the current observation, a respective next observation characterizing a respective next state of the environment, and a reward received in response to the agent performing the current action; selecting a plurality of transitions from the replay memory; and training the Q neural network on the plurality of transitions, comprising, for each transition of the plurality of transitions: processing the current observation and the current action in accordance with current values of the Q network parameters to generate an initial Q value for the transition; determining, from (i) a current value of a scaling term and (ii) the initial Q value, a scaled Q value for the transition; determining, from (i) the current value of the scaling term and (ii) the next observation included in the transition, a scaled temporal difference learning target for the transition; determining an error between the scaled temporal difference learning target and the scaled Q value; determining, based on computing a gradient of the error with respect to the Q network parameters, an update to the current values of the Q network parameters; and determining, based on computing a gradient of the error with respect to one or more scaling term parameters, an update to the current value of the scaling term.

Determining, from (i) the current value of the scaling term and (ii) the next observation, the scaled temporal difference learning target for the transition may comprise: processing, using the Q neural network, the next observation and each action in a set of possible actions that can be performed by the agent when interacting with the environment to output a respective Q value for the action that is an estimate of a return that would be received if the agent performed the action in response to the next observation included in the transition; selecting, from the set of possible actions, a selected action based on the respective Q values; determining, from a value of a discount factor and the Q value for selected action, an initial time-adjusted next expected return if the selected action is performed in response to the next observation; determining, from (i) the current value of the scaling term and (ii) the initial time-adjusted next expected return, a scaled, time-adjusted next expected return; and computing a sum of (i) the reward included in the transition and (ii) the scaled, time-adjusted next expected return.

Determining, from (i) the current value of the scaling term and (ii) the next observation, the scaled temporal difference learning target for the transition may further comprise: processing, using a target instance of the Q neural network and in accordance with target parameter values of the neural network, the next observation and each action in the set of possible actions that can be performed by the agent when interacting with the environment to output the respective Q value for the action that is the estimate of the return that would be received if the agent performed the action in response to the next observation included in the transition.

Determining, from (i) the current value of a scaling term and (ii) the initial Q value, the scaled Q value for the transition may comprise: computing a product of the scaling term and the initial Q value.

The method may further comprise initializing the current value of the scaling term to one.

The scaling term may be of form $\exp(\rho)$, where $\rho$ is a trainable parameter.

Determining, based on computing the gradient of the error with respect to the Q network parameters, the update to the current values of the Q network parameters may comprise: adding a ranking regularization term to the error, wherein the ranking regularization term depends on a maximum among (i) a constant plus a difference between (a) the initial Q value for the transition and (b) a Q value generated by processing the current observation and a remaining action in the set of possible actions that is different from the action included in the transition in accordance with current values of the Q network parameters and (ii) zero; and determining, based on computing a gradient of the ranking regularization term and the error with respect to the Q network parameters, the update to the current value of the scaling term.

The method may further comprise adding the ranking regularization term to the error according to a filtering scheme which determines whether the ranking regularization term should be added to the error based on the reward included in the transition.

Determining, based on computing the gradient of the error with respect to one or more scaling term parameters, the update to the current value of the scaling term may comprise: adding a scaling term regularization term to the error, wherein the scaling term regularization term depends on a difference between (i) the scaled Q value for the transition and (ii) a time-adjusted sum of respective rewards included in one or more subsequent transitions to the transition in the plurality of transitions selected from the replay memory; and determining, based on computing a gradient of the regularization term and the error with respect to the one or more scaling term parameters, the update to the current value of the scaling term.

Determining the update to the current values of the Q network parameters may further comprise determining a value for a Q network parameter learning rate; and determining the update to the current value of the scaling term may further comprise determining a value for a scaling term learning rate that is smaller than the value for a Q network parameter learning rate.

The value of the scaling term learning rate may be dependent on a number of the plurality of transitions selected from the replay memory.

Each transition in the replay memory may further comprise a respective next action performed by the agent in response to the next observation; and training the Q neural network on the plurality of transitions may further comprise, for each transition of the plurality of transitions: processing the current observation and the current action in accordance with current values of the Q network parameters to generate the initial Q value for the transition; determining, from the next observation and the next action included in the transition, a temporal difference learning target for the transition; determining an error between the temporal difference learning target and the initial Q value; determining, based on computing a gradient of the error with respect to the Q network parameters, an update to the current values of the Q network parameters; and determining, based on computing a gradient of the error with respect to one or more scaling term parameters, an update to the current value of the scaling term.

None of the plurality of transitions may have been generated by controlling the agent using the Q neural network.

The environment may be a real-world environment and the observations are generated by sensors arranged to sense a state of the real-world environment Another innovative aspect of the subject matter described in this specification can be embodied in a method comprising: receiving a new observation characterizing a new state of the environment being interacted with by the agent; processing the new observation using a Q neural network to generate a respective Q value for each action in a set of possible actions that can be performed by the agent in response to the new observation, the Q value for each action being an estimate of a return that would be received if the agent performed the action in response to the new observation, wherein the Q neural network has been trained using the method of any preceding claim; selecting, from the set of possible actions, an action based on the respective Q values; and causing the agent to perform the selected action. The environment may be a real world environment, the observations may be generated by sensors arranged to sense a state of the real-world environment, and the agent may be a robot or an autonomous or semi-autonomous land, air, or sea vehicle navigating through the environment. The Q neural network may have been trained using a simulated environment.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages.

Offline RL training (that is, RL training based on a pre-existing corpus of training data, and not generating additional training data during the training process to supplement the training data used for the training) is an effective algorithm for training neural networks used in selecting actions to be performed by agents because the network can be trained without the need of controlling the agent to interact with the real-environment. During training this avoids carrying out risky actions performed due to a suboptimal policy, and does not result in mechanical wear or tear or other damage to the real-world agent. Because the training process involves estimation of state-action pairs not well-covered by training data, conventional offline RL algorithms unavoidably incur extrapolation errors which, when compounded by bootstrapping, can lead to unbounded learning targets and thereby hinder successful training.

The disclosed techniques, however, can mitigate these issues by allowing for training data from a replay memory to be utilized in a way that increases the value of the selected data during offline RL training. In particular, by additionally training a scaling term that bounds a temporal difference learning target value to be within a reasonable range, impact of extrapolation errors on the training of the neural network caused by over-estimation of the learning target for training data can be mitigated, thereby allowing for a high-quality action selection policy to be learned in an extremely stable and data efficient manner. Moreover, by adopting a ranking-based regularization scheme, the disclosed techniques encourage more thorough updates to neural network parameter values when learning from already collected training data, and especially from training data that has been generated by a well-performing agent, compared with learning from extrapolated information about environment interaction that is yet to be collected, e.g., remaining actions in a set of possible actions that have not been selected by the agent during interaction, as well as corresponding rewards to be received by the agent in response to performing these unselected actions. This can further prevent extrapolation errors from hindering successful training.

As such, the disclosed techniques can increase the speed of training of neural networks used in selecting actions to be performed by agents and reduce the amount of training data needed to effectively train those neural networks. Thus, the amount of computing resources necessary for the training of the neural networks can be reduced. For example, the amount of memory required for storing the training data can be reduced, the amount of processing resources used by the training process can be reduced, or both. The increased speed of training of neural networks can be especially significant for complex neural networks that are harder to train or for training neural networks to select actions to be performed by agents performing complex reinforcement learning tasks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for training a Q neural network.

Like reference numbers and designations in the various drawings indicate like elements.

DETAILED DESCRIPTION

Figure 1:
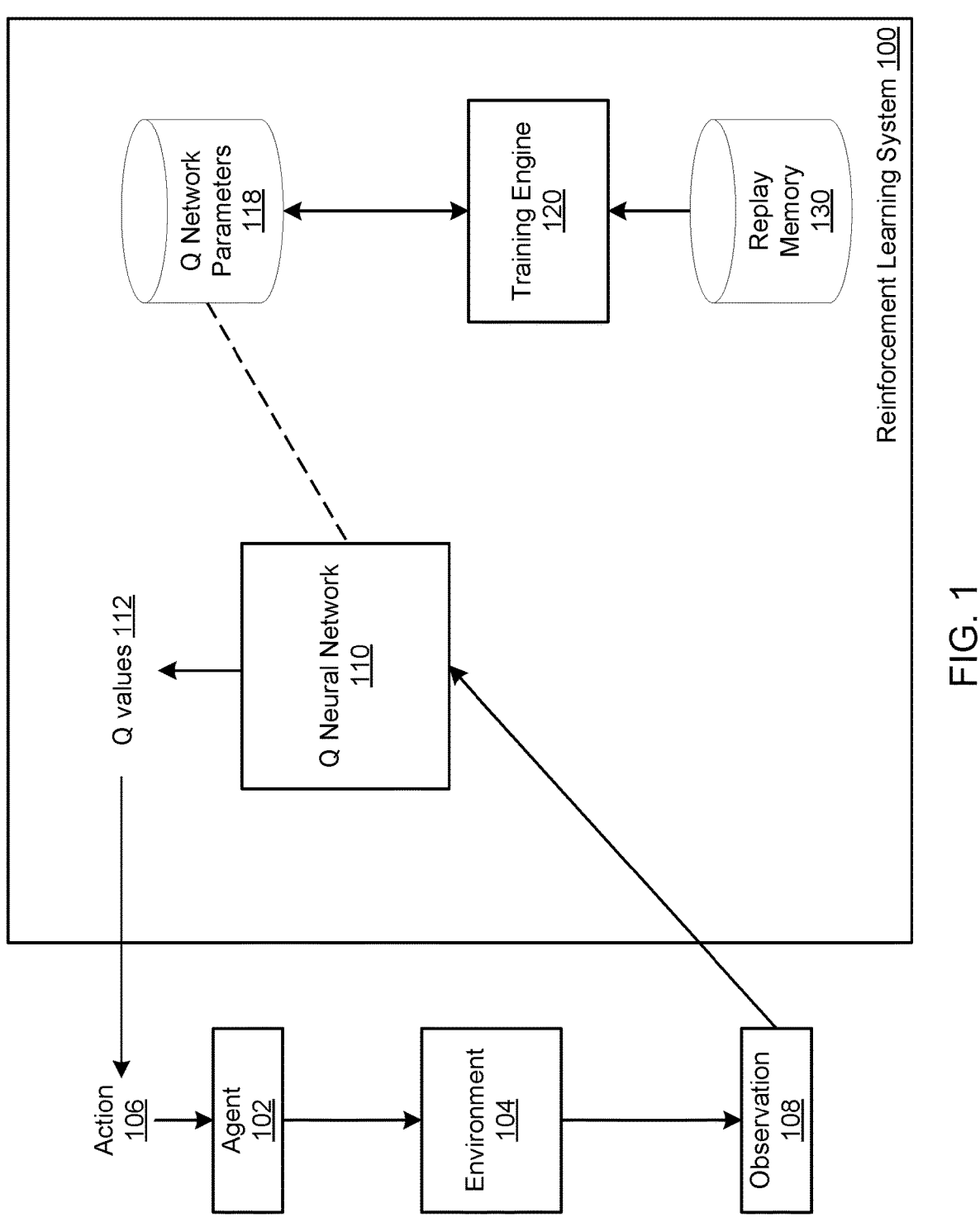
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment can be a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2, 3 or more dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future planned electrical power generation, and the agent may control actions or operations in the plant to achieve this.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In some implementations, the simulated environment may be a simulation of a particular real-world environment. For example, the system may be used to select actions in the simulated environment during training or evaluation of the control neural network and, after training or evaluation or both are complete, may be deployed for controlling a real-world agent in the real-world environment that is simulated by the simulated environment. This can avoid unnecessary wear and tear on and damage to the real-world environment or real-world agent and can allow the control neural network to be trained and evaluated on situations that occur rarely or are difficult to re-create in the real-world environment.

Generally, in the case of a simulated environment, the observations may include simulated versions of one or more of the previously described observations or types of observations and the actions may include simulated versions of one or more of the previously described actions or types of actions.

Optionally, in any of the above implementations, the observation at any given time step may include data from a previous time step that may be beneficial in characterizing the environment, e.g., the action performed at the previous time step, the reward received at the previous time step, and so on.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations 108, with each observation characterizing a respective state of the environment 104, and, in response to each observation, selects an action 106 from a predetermined set of actions to be performed by the reinforcement learning agent 102 in response to the observation 108. In response to some or all of the actions performed by the agent 102, the reinforcement learning system 100 receives a reward. Each reward is a numeric value received from the environment 104 as a consequence of the agent performing an action, i.e., the reward will be different depending on the state that the environment 104 transitions into as a result of the agent 102 performing the action.

In particular, the reinforcement learning system 100 selects actions 106 to be performed by the agent 102 using a Q neural network 110 and a training engine 120.

The Q neural network 110 is a neural network that receives as an input an observation 108 characterizing the state of the environment 104 and generates as an output a respective Q value 112 for each action in a set of actions.

The Q value 112 for an action is an estimate of a "return" that would result from the agent performing the action in response to the current observation 108 and thereafter selecting future actions performed by the agent 102 in accordance with current values of the parameters of the Q neural network. A return refers to a cumulative measure of "rewards" received by the agent, for example, a time-discounted sum of rewards.

The function of the Q neural network 110 is thus to generate data which indicates a Q value 112 for each possible action in the set of actions. In other words, its function is to evaluate a function Q (observation, action) for each possible action. Accordingly, in the following text we will refer to process of receiving an observation and determining a Q value for a certain action as "processing an observation and a certain action in accordance with current values of the Q network parameters to generate a Q value for the action". The Q neural network 110 may do this simultaneously for all actions of the set of actions. In other words, in this document expressions such as "processing an observation and a certain action in accordance with current values of the Q network parameters to generate a Q value for the action" are to be understood as including, in one form, "processing an observation in accordance with current values of the Q network parameters to generate Q values for all the set of actions and processing a certain action to select the generated Q value corresponding to the certain action".

Note that, in some embodiments, the Q network 110 may be implemented by a computer process (e.g. a multilayer perceptron, MLP) which receives both the observation and data specifying a single one of the set of actions (e.g. a one-hot vector with a component for each of the actions), and generates just the Q value for that single action (i.e. the same Q value which the Q neural network with the current values of the Q network parameters would generate for that action upon receiving the observation). This too is considered below an example of "processing an observation and a certain action in accordance with current values of the Q network parameters to generate a Q value for the action". Note that if the computer process receives at each of number of successive times (i) the observation and (ii) a data indicating a corresponding one of the set of possible actions, the computer process would successively generate the Q values for all possible actions in the set.

The Q neural network 110 can be implemented with any appropriate neural network architecture that enables it to perform its described function. In one example, the Q neural network 110 may include an "embedding" sub-network, a "core" sub-network, and a "selection" sub-network. A sub-network of a neural network refers to a group of one or more neural network layers in the neural network. When the observations are images, the embedding sub-network can be a convolutional sub-network, i.e., that includes one or more convolutional neural network layers, that is configured to process the observation for a time step. When the observations are lower-dimensional data, the embedding sub-network can be a fully-connected sub-network. The core sub-network can be a recurrent sub-network, e.g., that includes one or more long short-term memory (LSTM) neural network layers, that is configured to process the output of the embedding sub-network and, in some cases, action data defining each action from the set of possible actions (or data derived from the action data or both). The selection sub-network can be configured to process the output of the core sub-network to generate the Q value outputs for the actions.

To select the action 106 to be performed by the agent, the system can process the Q values (e.g., using a soft-max function) to generate a respective probability value for each possible action, and then sample an action in accordance with the probability values for the actions. Alternatively, the system can select the action with the highest Q value as the action to be performed by the agent.

To allow the agent 102 to effectively interact with the environment 104, the reinforcement learning system 100 includes a training engine 120 that trains the Q neural network 110 to determine trained values of the parameters 118 of the Q neural network.

To assist in the training of the Q neural network 110, the training engine 120 maintains a replay memory 130. The replay memory 130 stores data items ("transitions") generated as a consequence of the interaction of the agent 102 or another agent with the environment 104 or with another instance of the environment for use in training the Q neural network 110.

In some implementations, each transition is a tuple that includes: (1) a current observation characterizing the current state of the environment at one time; (2) a current action performed by the agent in response to the current observation; (3) a next observation characterizing the next state of the environment after the agent performs the current action, i.e., a state that the environment transitioned into as a result of the agent performing the current action; (4) a reward received in response to the agent performing the current action; and, optionally, (5) a respective next action performed by the agent in response to the next observation.

The training engine 120 trains the action selection neural network 110 by repeatedly selecting transitions from the replay memory 130 (e.g. at random) and training the Q neural network 110 on the selected transitions.

This training setup may be referred to as offline reinforcement learning, which concentrates the learning process onto relying on logged transition data without actually controlling the agent 102 using the Q neural network to interact with the environment 104. That is, the training engine 120 can train the Q neural network 110 even when none of the plurality of transitions in the replay memory 130 have been generated by controlling the agent using the Q neural network.

Offline reinforcement learning enables using logged data to train the Q neural network that is used to control the agent on a wide range of technical use cases, including in real-world applications such as healthcare and self-driving cars, where repeated interaction with the environment is costly and potentially unsafe or unethical, and where logged historical data may be abundant. However, offline reinforcement learning may also pose unique challenges to the RL training of the system. One major challenge is dealing with errors caused by the over-estimation of values for state-action pairs not well-covered by the transition data. Due to bootstrapping, these errors get amplified during training and can lead to divergence, thereby hindering successful training of the system. Another challenge originates from the staleness of the training data. Simply stated, compared to the online reinforcement learning, in the offline reinforcement learning the agent cannot explore new actions or states that have not been collected during the generation of the training dataset, even if those new actions appear to be optimal. This tends to manifest as an over-estimation of the Q values of actions not present in the training dataset, which is reinforced due to the bootstrapping mechanism of learning, leading to policies (as parameterized by the Q neural network) that tend to move away from the region of the state space covered by the training dataset, into regions where the learned policy (i.e., trained Q neural network) is unpredictable.

Figure 2:
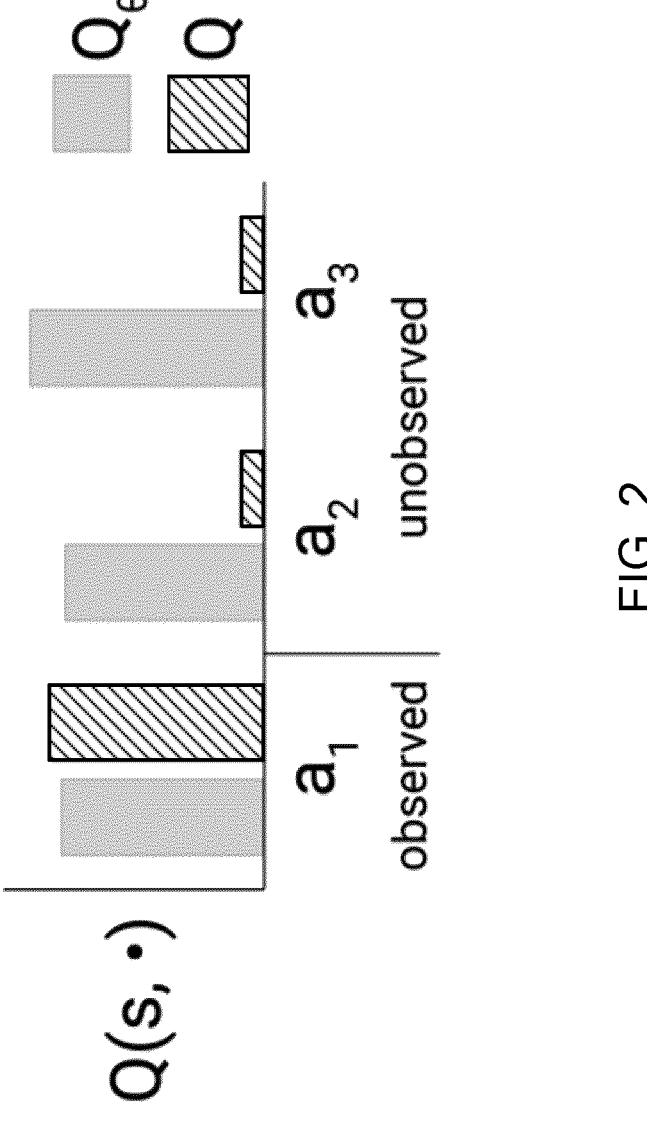
FIG. 2 is an illustration of an example extrapolation error which hinders conventional training of a reinforcement learning system.

FIG. 2 is an illustration of an example extrapolation error which hinders conventional training of a reinforcement learning system. Q is the actual Q value of an action a when performed in response to an observation s characterizing a state of the environment, and $Q_\theta$ is the estimated (or, more precisely, extrapolated) Q value generated for the action a by processing the observation s characterizing the state using the Q neural network in accordance with current values of the Q network parameters $\theta$ during the training of the system.

In the example of FIG. 2, $a_1$ is observed in the replay memory (i.e., included in at least one transition stored in the replay memory 130 where the observation s is also included), while $a_2$ and $a_3$ are unobserved (i.e., not included in any transition where the observation s is also included). In this example, in order to evaluate the loss of the Q neural network on a given task during training, the Q neural network (or, equivalently, the current values of the Q network parameters $\theta$) is used to extrapolate beyond the training data, i.e., to generate extrapolated Q values for unobserved actions $a_2$ and $a_3$. This extrapolation may lead to value over-estimation.

In more detail, value over-estimation happens when the Q neural network outputs a larger estimated Q value than the actual Q value for an action in the transition. When used to select the action a to be performed by the agent in response to the observation s (as described earlier) and, correspondingly, to evaluate the loss of the Q neural network during training, these estimated Q values may lead to overconfident estimates of the true value of the state that are propagated in the learning process. For example, in FIG. 2, the estimated Q values could result in $a_3$ (rather than $a_1$) being selected. While in online RL this over-estimation may lead to optimistic exploration that is followed by a correction of the over-estimation through additional learning, in the offline RL setup the over-estimation typically causes the training of the system to diverge and thereby hinders effective training or reduces the performance of the trained Q network.

In the cases where the estimates are arbitrarily high, these errors which resulted from extrapolation will be further propagated into the values of other states (e.g., states in immediately preceding or subsequent transitions) via bootstrapping. Additionally, unobserved actions' impact becomes even larger in the low data regime, where the chance of encountering unobserved actions is greater and Q neural network are more prone to extrapolation errors.

Thus, to overcome the aforementioned drawbacks and to improve overall training effectiveness (e.g., in terms of processing cycles), the training engine 120 employs a regularized offline learning scheme which can effectively mitigate the impact of extrapolation errors on the offline training caused by inaccurate estimation of interaction information missing from the replay memory. In particular, the regularized offline learning scheme can include (i) Q value reparameterization through the usage of a scaling term, (ii) transition ranking regularization, and (iii) behavior value estimation, each of which can be used separately or combined, for example, in associated with Q learning or Sarsa learning. Training the Q neural network 110 using this regularized offline learning scheme is described in more detail below with reference to FIGS. 3 and 4.

FIG. 3 is a flow diagram of an example process 300 for training a Q neural network. For convenience, the process 300 will be described as being performed by a system of one or more computers located in one or more locations. For example, a system, e.g., the reinforcement learning system 100 of FIG. 1, appropriately programmed, can perform the process 300.

The system maintains a replay memory (302). As described above, the replay memory stories a plurality of transitions generated as a result of the reinforcement learning agent (or another agent) interacting with the environment (or with another instance of the environment). In various cases, the agent may be controlled by another control system, including by a human-operated or another machine learning-based control system, by a hard-coded policy that selects actions to be performed by the agent in accordance with pre-programmed logics, or simply by a random policy that selects actions with uniform randomness.

In the example of FIG. 3, each transition can be a tuple that includes: (1) a current observation s characterizing the current state of the environment at one time; (2) a current action a performed by the agent in response to the current observation; (3) a next observation s' characterizing the next state of the environment after the agent performs the current action, i.e., a state that the environment transitioned into as a result of the agent performing the current action; and (4) a reward r received in response to the agent performing the current action a'.

The system selects a plurality of transitions from the replay memory (304). The system can select a transition either randomly or according to a prioritized strategy, e.g., based on the value of an associated temporal difference learning error or some other learning progress measure.

To train the Q neural network on the selected plurality of transitions, the system can repeatedly perform the followings steps 306-316 for each transition of the plurality of transitions.

The system processes the current observation s and the current action a in accordance with current values of the Q network parameters $\theta$ to generate an initial Q value $Q_\theta(s, a)$ for the transition (306). The Q value is an estimate of a return that would be received if the agent performed the action in response to the current observation.

In some implementations, the system can use Q value reparameterization to reduce over-estimation. In these implementations, the system determines, from (i) a current value of a scaling term $\alpha$ and (ii) the initial Q value, a scaled Q value for the transition (308). In general the system uses the scaling term $\alpha$ to prevent severe over-estimation during training by bounding the initial Q values predicted by the Q neural network.

In various cases, for example depending on the actual configuration of the Q neural network, the initial Q values may be either bounded or unbounded. In the cases where they are unbounded, the system can process an initial Q value (e.g., by using a tanh activation function) to generate "standardized" Q value $\hat{Q}_\theta$ that is bounded within a predetermined range, e.g., $\hat{Q}_\theta(s, a) \in [-1, 1]$.

In particular, the system can determine the scaled Q value by computing a product of the scaling term $\alpha$ and the initial Q value (or the initial Q value after standardization processing), i.e., determine the scaled Q value as $\alpha Q_\theta(s, a)$ or $\alpha \hat{Q}_\theta(s, a)$. The scaled Q values that are determined from standardized Q values are always bounded in absolute value by the scaling term $\alpha$, e.g., $\alpha \hat{Q}_\theta(s, a) \in [-\alpha, \alpha]$.

In some of these implementations, the current value of scaling term $\alpha$ can be independent from both the current action and the current observation included in the transition. In these implementations, the system can disentangle the value of the scaling term $\alpha$ from the relative magnitude of initial Q values predicted by the Q neural network, while being able to impose constraints on the scaling term $\alpha$.

In some of these implementations, the current value of the scaling term $\alpha$ can be defined by one or more scaling term parameters, i.e., can be determined by evaluating a predetermined function over the one or more scaling term parameters, that are learned during the training of the Q neural network. For example, the scaling term $\alpha = \exp(\rho)$ such that $\alpha > 0$, where $\rho$ is a trainable parameter, the current value of which may be determined as part of the training of the Q neural network by the system.

In these implementations, the system determines, from (i) the current value of the scaling term $\alpha$ and (ii) the next observation included in the transition, a scaled temporal difference learning target for the transition (310). As will be described further below with reference to FIG. 4, the scaled temporal difference learning target can be the sum of: (a) a scaled, time-adjusted (e.g., time-discounted) next expected return if a next action is performed in response to the next observation in the transition and (b) the reward in the transition. Determining this scaled temporal difference learning target differs from determining conventional temporal difference learning targets in that, in addition to using a discount factor $\gamma$ to discount (i.e., reduce) rewards that are expected to be received from the environment further into the future, the system also uses the scaling term $\alpha$ to adjust the already time-adjusted next expected return, i.e., to determine the scaled, time-adjusted next expected return from an initial time-adjusted next expected return. As similarly described above, the system uses the scaling term $\alpha$ to prevent severe over-estimation of the temporal difference learning target during training.

In these implementations, the system determines an error between the scaled temporal difference learning target and the scaled Q value (312).

In particular, the system computes a difference between the scaled temporal difference learning target and the scaled Q value:

$$\alpha \hat{Q}_\theta(s, a) - \left( r + \gamma \alpha' \max_{a'} \hat{Q}_{\theta'}(s', a') \right),$$

where $\alpha \hat{Q}_\theta(s, a)$ is the scaled Q value, and $$\left( r + \gamma \alpha' \max_{a'} \hat{Q}_{\theta'}(s', a') \right)$$

is the scaled temporal difference learning target. The values $\theta'$ are referred to as "target network parameters". They are updated to be equal to the current values of Q neural network parameters $\theta$ at intervals (e.g. after every C update steps during the training of the Q neural network) and otherwise held fixed between individual update steps. As noted, the value of the scaling term $\alpha$ may be iteratively adjusted during the training, and if so the algorithm employs a target scaling term $\alpha'$ which may be updated at intervals to be equal to the current value $\alpha$. In versions of the method in which a is not iteratively adjusted, $\alpha'$ is equal to $\alpha$. More generally, the error can be any appropriate relative measure between two values, e.g., one of: the difference, the square of the difference, the cube of the difference, the square root of the difference, and so on.

In some other implementations, in addition to or instead of using Q value reparameterization, the system can utilize ranking regularization to encourage the Q neural network to generate predictable Q values for Q network inputs that include unseen (or rarely seen) actions, observations, or both. In these implementations, the system can add a ranking regularization term to an error which, when used to evaluate the loss of the Q neural network, encourages the Q neural network to output lower Q values from processing Q network inputs that include actions, observations, or both that have not (or have only rarely) been used during the training. Specifically, the error can be either the error determined from step 312 or a conventional temporal difference learning error associated with the selected transition. The conventional temporal difference learning error can be determined based on computing a difference between: (i) the initial Q value determined from step 306; and (ii) the sum of: (a) a time-discounted next expected return if a next action is performed in response to the next observation in the transition and (b) the reward in the transition.

In particular, the ranking regularization term can be computed as, for each remaining action in the set of possible actions that is different from the action included in the transition, a summation over a maximum among (i) a constant plus a difference between (a) the initial Q value for the transition and (b) a Q value generated by processing the current observation and the remaining action in accordance with current values of the Q network parameters and (ii) zero. Mathematically, the system can compute the ranking regularization term as:

$$\mathcal{L}_{rank}(\theta) = \sum_{i=0, i \neq t}^{|A|} \max(Q_\theta(s_t, a_i) - Q_\theta(s_t, a_t) + v, 0)^2,$$

where the constant $v$ may be set to have a small positive value (e.g., 5e-1, 5e-2, or 5e-3), and $|A|$ is the set of possible actions, among which $a_t$ is the action included in the transition.

When utilized by the system, this ranking regularization term encourages the Q neural network to output lower Q values from processing Q network inputs that include actions, observations, or both that have not (or have only rarely) been used during the training because the error (that includes the ranking regularization term and that drives the training of the Q neural network) is generally greater when the Q values generated by the Q neural network from processing such Q network inputs are higher.

In some of these implementations, instead of adding this ranking regularization term to the error associated with every transition, the system can add the ranking regularization term to the error according to a filtering scheme. The filtering scheme determines whether the ranking regularization term should be added to the error based on the reward included in the transition. For example, the filtering scheme may specify that the ranking regularization term is only to be added to the errors associated with "rewarding" transitions (i.e., transitions that include rewards that are greater than a predetermined threshold) instead of to the errors associated with all of the selected transitions, including those that have rewards that are below the predetermined threshold, e.g., transitions generated as a result of the agent performing suboptimal actions.

In some of the implementations where Q value reparameterization is used, the system can additionally impose a soft-constraint to encourage the Q neural network to generate respective Q values for the set of possible actions from which an action that is close to the action included in the transition can be selected. This further prevents gross overestimation of the Q neural network during training. In these implementations, the system can add a scaling term regularization term to the error.

In particular, the scaling term regularization term can depend on a difference between (i) the scaled Q value for the transition and (ii) a time-adjusted sum of respective rewards included in one or more subsequent transitions to the transition in the plurality of transitions selected from the replay memory. Mathematically, the system can compute the scaling term regularization term as:

$$C(\alpha) = \mathbb{E}[\text{softplus}(\alpha \hat{Q}_\theta(s,a) - G^B(s))^2],$$

where for each selected transition in the plurality of transitions selected from the replay memory, $\alpha \hat{Q}_\theta(s, a)$ is the scaled Q value for the selected transition, and $G^B(s)$ is the time-adjusted sum of respective rewards included in one or more transitions that are subsequent to the selected transition. In this example, the system relies on the softplus function to constrain scaling term $\alpha$ only when $Q_\theta(s, a) > G^B(s)$. Softplus is a smooth approximation to a rectified linear (ReLU) function, and may be defined by softplus $$(x) = \frac{1}{\beta} * \log(1 + \exp(\beta * x))$$

where $\beta$ is a real value, which may be equal to 1.

The system determines, based on computing a gradient of a loss function that includes the error with respect to the Q network parameters, an update to the current values of the Q network parameters (314). In particular, the loss function can include the error (i.e., either the error determined from step 312, or the conventional temporal difference learning error) and, in some implementations, additional loss terms that are dependent on the ranking regularization term or the scaling term regularization term or both, and the system can determine the update through backpropagation.

The system determines, based on computing a gradient of the loss function that includes the error with respect to the one or more scaling term parameters that define the scaling term and through backpropagation, an update to the current value of the scaling term (316).

In some implementations, the respective current values of the Q network parameters are updated at a different (e.g., larger) learning rate than those of the one or more scaling term parameters. The system can set different Q network parameter learning rates and different scaling term learning rates based on the minibatch size of the selected transitions used to train the Q neural network, i.e., based on the exact number of the plurality of transitions selected from the replay memory.

The system then proceeds to update the current values of the Q network parameters and the scaling term based on the determined updates in accordance with an appropriate machine learning training algorithm (e.g., stochastic gradient descent algorithm, Adam algorithm, or rmsProp algorithm). Alternatively, the system only proceeds to update the current values of the Q network parameters and the scaling term once the steps 306-316 have been performed for the entire batch of the selected plurality of transitions. In other words, the system combines, e.g., by computing a weighted or unweighted average between, respective updates that are determined during the fixed number of iterations of the steps

306-316 and proceeds to update the current values of the Q network parameters and the scaling term based on the combined update.

Figure 4:
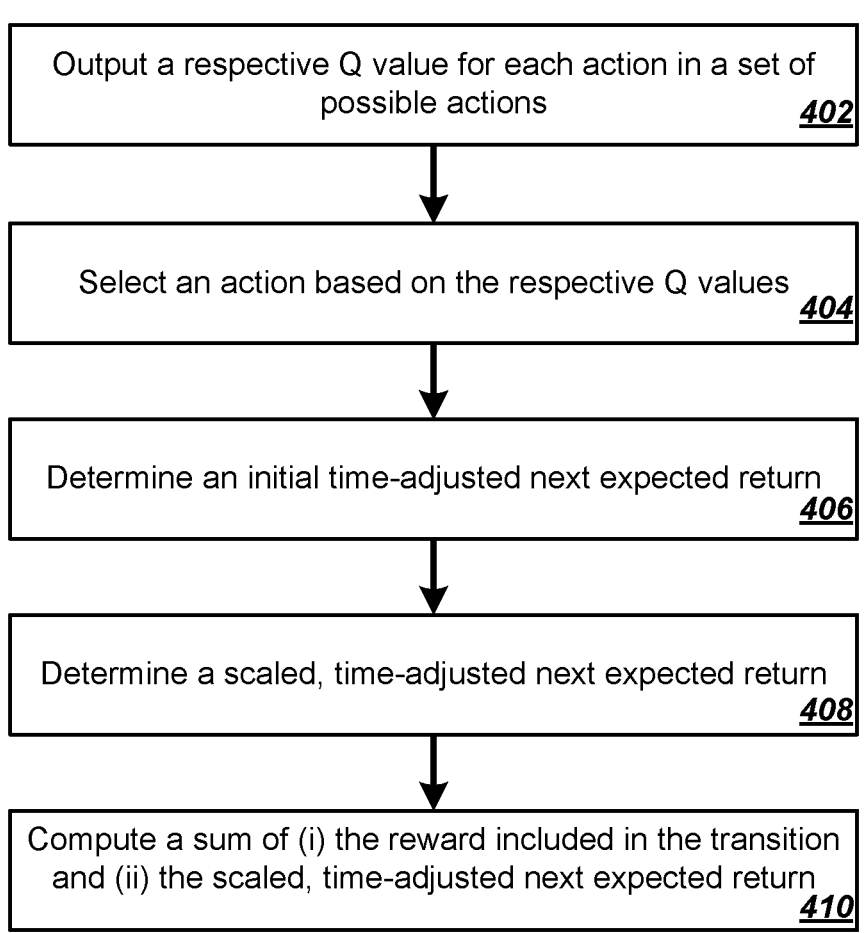
FIG. 4 is a flow diagram of an example process for determining a scaled temporal difference (TD) learning target.

FIG. 4 is a flow diagram of an example process 400 for determining a scaled temporal difference learning target. For convenience, the process 400 will be described as being performed by a system of one or more computers located in one or more locations. For example, a system, e.g., the reinforcement learning system 100 of FIG. 1, appropriately programmed, can perform the process 400.

For each transition, the scaled temporal difference learning target can be the sum of: (a) a scaled, time-adjusted (e.g., time-discounted) next expected return if a next action is performed in response to the next observation in the transition and (b) the reward in the transition. The manner in which the system selects the next action and determines the next expected return is dependent on the reinforcement learning algorithm being used to train the Q neural network.

For example, in a Q learning technique, the system selects as the next action the action for which, when the next observation is provided as input to the Q neural network (or a "target" Q neural network, i.e., a target instance of the Q neural network), the Q neural network (or the target Q neural network) outputs the highest Q value, and uses the Q value generated by providing the next observation as input to the Q neural network (or the target Q neural network) as the next return. In other words, in this example, the system processes, using the Q neural network (or the target Q neural network) and in accordance with parameter values of the Q neural network (or the target Q neural network), the next observation and each action in the set of possible actions that can be performed by the agent when interacting with the environment to output the respective Q value for the action (402), and then selects, from the set of possible actions, a selected action based on the respective Q values (404), i.e., selects the action that has the highest Q value. The respective Q value for each action is an estimate of a return that would be received if the agent performed the action in response to the next observation included in the transition.

In this example, the system can use the target Q neural network to mimic the Q neural network in that, at every fixed number of training steps, parameter values from the Q neural network are copied across to the target Q neural network. The target Q neural network is used for determining the next expected returns which are then used for determining the temporal difference learning targets from which drives the training of the Q neural network. This helps to stabilize the learning. In some implementations, rather than copying the parameter values to the target Q neural network, the parameter values of the target Q neural network slowly track the Q neural network (the "learning" neural network) according to $\theta' \leftarrow \tau\theta + (1-\tau)\theta'$ where $\theta'$ denotes the parameter values of the target Q neural network and $\theta$ denotes the parameter values of the Q neural network and $\tau \ll 1$.

As yet another example, in a Sarsa learning technique, the next action is the action that was actually performed by the agent in response to the next observation, and the next return is the Q value generated by providing the next observation and, in some cases, the next action as input to the Q neural network (or a target instance of the Q neural network). Training the Q neural network using the regularized offline learning scheme together with the Sarsa learning technique will be described further below with reference to FIG. 5.

The system determines, from a value of a discount factor $\gamma$ and the Q value for selected action, an initial time-adjusted next expected return if the selected action is performed in response to the next observation (406). In particular, to determine the initial time-adjusted next expected return, the system can compute a product of the discount factor $\gamma$ and the Q value for selected action $$, \max_{a'}\hat{Q}_{\theta'}(s', a').$$

The system determines, from (i) the current value of the scaling term and (ii) the initial time-adjusted next expected return, a scaled, time-adjusted next expected return (408). In particular, for example, the system can compute a product of the target scaling term $\alpha'$ and the initial time-adjusted next expected return and, correspondingly, determine the scaled, time-adjusted next expected return as:

$$\gamma\alpha'\max_{a'}\hat{Q}_{\theta'}(s', a')\Bigg].$$

In this example, similar to the Q network parameter values update scheme in the double deep Q learning technique, the system uses the target scaling term $\alpha'$ to mimic the scaling term $\alpha$ in that, at intervals, the value of the scaling term is copied across to the target scaling term (or, in that the value of target scaling term slowly tracks that of the scaling term according to a predetermined schedule). The target scaling term is used for determining the scaled, time-adjusted next expected returns which are then used for determining the scaled temporal difference learning targets from which drives the training of the Q neural network. This helps to stabilize the learning.

The system then determines the scaled temporal difference learning target by computing a sum of (i) the reward included in the transition and (ii) the scaled, time-adjusted next expected return (410). That is, the system can determine the scaled temporal difference learning target as $$\Bigg(r + \gamma\alpha'\max_{a'}\hat{Q}_{\theta'}(s', a')\Bigg].$$

An example algorithm for training the Q neural network using a regularized offline learning scheme is shown below.

---

Algorithm 1 Algorithm of Reparametrized Q-Network

---

Inputs: Dataset of trajectories$\mathcal{D}$ , batch size to update $\theta$: B1, batch size to update $\rho$:B2, and number of actors A.
Initialize $\hat{Q}$ weights $\theta$.
Initialize $\alpha$ to 1.
Initialize target policy weights $\theta' \leftarrow \theta$.
for $n_{steps}$ do
   Sample transition sequences $(s_{t:t+m}, a_{t:t+m}, r_{t:t+m})$ from dataset$\mathcal{D}$ to
   construct a mini-batch of size B.
   Calculate loss$\mathcal{L}$ $(s_t, a_t, r_t, s_{t+1}; \theta, \alpha)$ using target network.
   Update $\theta$ with GD: $\theta \leftarrow \theta - \eta_1 \nabla_\theta\mathcal{L}(\theta)$
   Update $\alpha$ with GD: $\alpha \leftarrow \alpha - \eta_1 \sqrt{B_1/B2} \nabla_\rho\mathcal{L}(\rho)$
   If t mod $t_{target} = 0$, update the target weights and $\alpha$, $\theta' \leftarrow \theta$, $\alpha' \leftarrow \alpha$.
end for

---

In the example algorithm shown above, the value of the scaling term $\alpha$ is initialized to one, and then during training is updated using a same technique as the Q network PGP parameters $\theta$ are updated (i.e., stochastic gradient descent), but preferably at a smaller learning rate (e.g., by selecting a larger minibatch B2 of transitions than the minibatch B1 of transitions from the replay memory) so as to stabilize the learning and reduce the variance of the estimations. This example algorithm also utilizes the double deep Q learning technique which makes use of a target Q neural network and a target scaling term, where the values of the target Q network parameters θ' and the value of the target scaling term α' are updated every $t_{target}$ steps.

Figure 5:
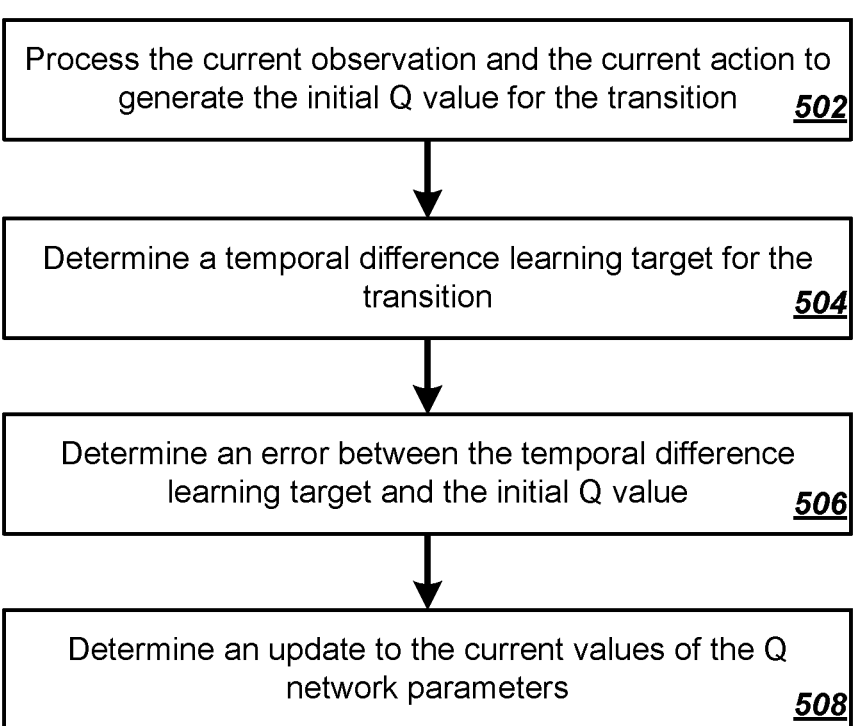
FIG. 5 is a flow diagram of another example process for training a Q neural network

FIG. 5 is a flow diagram of another example process 500 for training a Q neural network. For convenience, the process 500 will be described as being performed by a system of one or more computers located in one or more locations. For example, a system, e.g., the reinforcement learning system 100 of FIG. 1, appropriately programmed, can perform the process 500.

The example of FIG. 5 differs from the example of FIG. 3 in that, each transition in the replay memory additionally includes a respective next action performed by the agent in response to the next observation included in the transition. In other words, in the example of FIG. 5, the system maintains a plurality of transitions at a replay memory, where each transition can be a tuple that includes: (1) a current observation s characterizing the current state of the environment at one time; (2) a current action a performed by the agent in response to the current observation; (3) a next observation s' characterizing the next state of the environment after the agent performs the current action, i.e., a state that the environment transitioned into as a result of the agent performing the current action; (4) a reward r received in response to the agent performing the current action; and, (5) a respective next action a' performed by the agent in response to the next observation.

The system selects a plurality of transitions from the replay memory and then trains the Q neural network by repeatedly performing the followings steps 502-508 for each transition of the selected plurality of transitions.

The system processes the current observation and the current action in accordance with current values of the Q network parameters to generate the initial Q value for the transition (502).

The system determines, from the next observation and the next action included in the transition, a temporal difference learning target for the transition (504). This step may be referred to as behavior value estimation because the next action is the action that was actually performed by the agent controlled using the "behavioral" control system (which, as described above, may for example be a human-operated or another machine learning-based control system) in response to the next observation when generating the transition to be included in the replay memory. The next return is the Q value generated by providing the next observation and, in some cases, the next action as input to the Q neural network, which is configured to process the next observation and, in some cases, the next action in accordance with current values of the Q network parameters to generate a Q value for the next action. This Q value is an estimate of a return that would be received if the agent performed the next action in the transition in response to the next observation in the transition. To determine a time-adjusted next expected return, the system can compute a product of a discount factor γ and the Q value generated by Q neural network. The system can then compute the temporal difference learning target as the sum of: (a) the time-adjusted (e.g., time-discounted) next expected return and (b) the reward in the transition.

The system determines an error between the temporal difference learning target and the initial Q value (506). In particular, the system computes a difference between the temporal difference learning target and the initial Q value:

$$Q_\theta(s,a)-(r+\gamma Q_{\theta'}(s',a')),$$

where $Q_\theta(s, a)$ is the initial Q value, and $(r+\gamma Q_{\theta'}(s', a'))$ is the temporal difference learning target.

More generally, the error can be any appropriate relative measure between two values, e.g., one of: the difference, the square of the difference, the cube of the difference, the square root of the difference, and so on.

The system determines, based on computing a gradient of a loss function that includes (i) the error and, in some implementations, (ii) the ranking regularization term which may be added to the error according to the filtering scheme with respect to the Q network parameters and through backpropagation, an update to the current values of the Q network parameters (508).

Mathematically, in the cases where according to the filtering scheme the ranking regularization term is to be added to the error, the loss function L can include a first loss term that is dependent on the error $(Q_\theta(s,a)-(r+\gamma Q_{\theta'}(s',a'))$ and a second loss term that is dependent on the ranking regularization term $$\sum_{i=0, i \neq t}^{|A|} \max(Q_\theta(s_t, a_i) - Q_\theta(s_t, a_t) + v, 0)^2.$$

Figure 6:
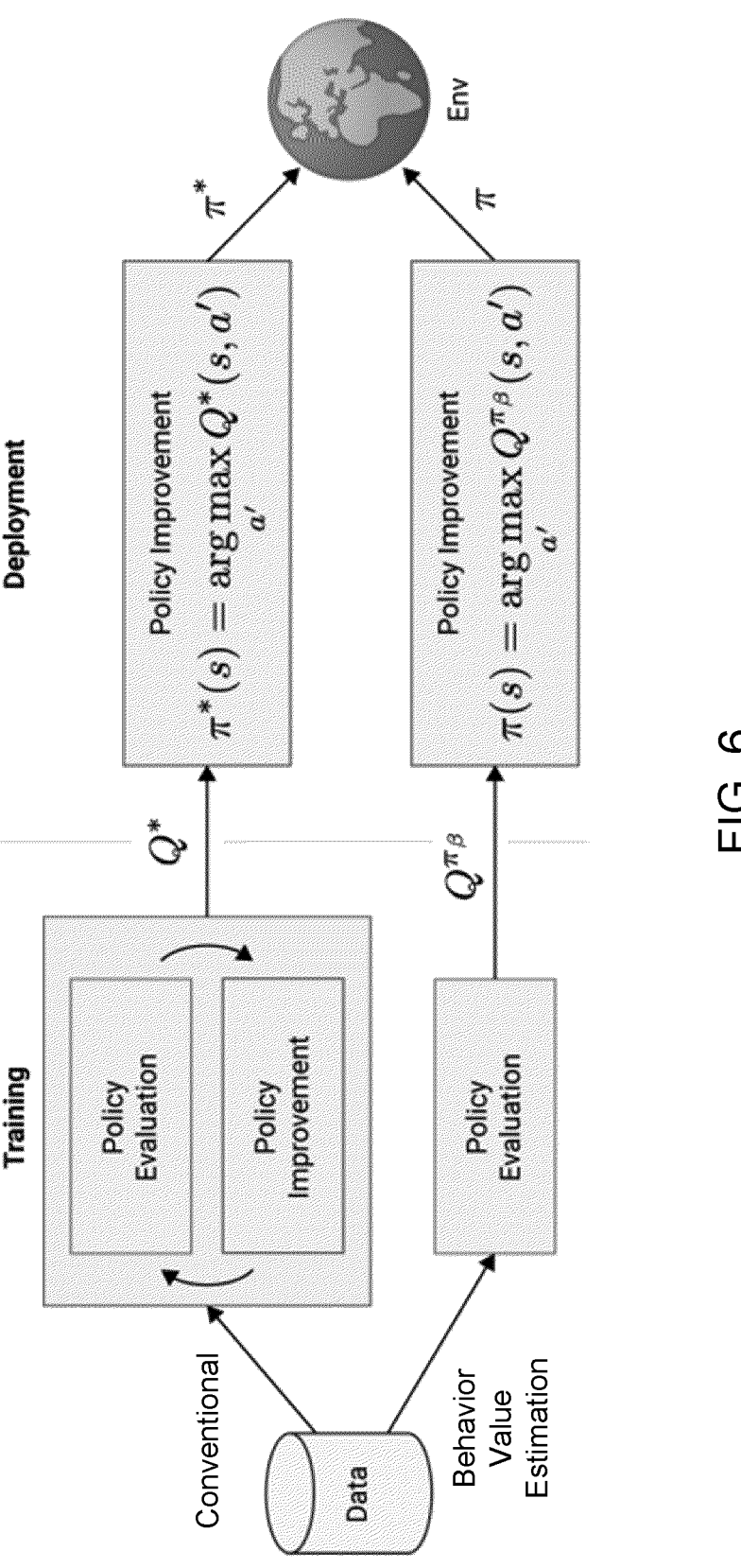
FIG. 6 is an illustration of a comparison between the example training process of FIG. 5 and a conventional training process.

FIG. 6 is an illustration of a comparison between the example training process of FIG. 5 and a conventional training process. In offline reinforcement learning setup, action selection policy improvement (by selecting actions greedily with respect to the current values of the Q network parameters $Q_\theta$, namely computing a maximization over all actions $\pi(s)=\arg \max_a Q_\theta(s, a)$) may be risky as it relies on extrapolating beyond the data.

Nevertheless, some conventional approaches perform many iterations of policy improvement during training (as shown on the top side of FIG. 6) when computing target Q values for the transitions in the training data, resulting in extrapolation error and divergence. In contrast, as shown on the bottom side, by performing process 500 the system is able to estimate the value of the behavior policy during training without performing any policy improvement steps, i.e., without performing a maximization over all actions, and perform policy improvement (by computing a maximization over all actions) only when using the trained Q neural network to control an agent to interact with the environment, i.e., only when selecting actions to be performed by the agent after the Q neural network has already been trained, and therefore mitigates the impact of these extrapolation errors during training. Further, the ranking regularization is used to train the Q neural network to generate Q values that result in actions in the dataset that lead to successful outcome to be more likely to be selected than any unobserved actions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for training a Q neural network having a plurality of Q network parameters and used to select actions performed by a reinforcement learning agent interacting with an environment by performing actions that cause the environment to transition states, the method comprising:

maintaining a replay memory, the replay memory storing a plurality of transitions generated as a result of the reinforcement learning agent interacting with the environment, each transition comprising a respective current observation characterizing a respective current state of the environment, a respective current action performed by the agent in response to the current observation, a respective next observation characterizing a respective next state of the environment, and a reward received in response to the agent performing the current action;

selecting a plurality of transitions from the replay memory; and training the Q neural network on the plurality of transitions, comprising, for each transition of the plurality of transitions:

processing the current observation and the current action in accordance with current values of the Q network parameters to generate an initial Q value for the transition;

determining, from (i) a current value of a scaling term and (ii) the initial Q value, a scaled Q value for the transition;

determining, from (i) the current value of the scaling term and (ii) the next observation included in the transition, a scaled temporal difference learning target for the transition;

determining an error between the scaled temporal difference learning target and the scaled Q value;

determining, based on computing a gradient of the error with respect to the Q network parameters, an update to the current values of the Q network parameters; and determining, based on computing a gradient of the error with respect to one or more scaling term parameters, an update to the current value of the scaling term.

2. The method of claim 1, wherein determining, from (i) the current value of the scaling term and (ii) the next observation, the scaled temporal difference learning target for the transition comprises:

processing, using the Q neural network, the next observation and each action in a set of possible actions that can be performed by the agent when interacting with the environment to output a respective Q value for the action that is an estimate of a return that would be received if the agent performed the action in response to the next observation included in the transition;

selecting, from the set of possible actions, a selected action based on the respective Q values;

determining, from a value of a discount factor and the Q value for selected action, an initial time-adjusted next expected return if the selected action is performed in response to the next observation;

determining, from (i) the current value of the scaling term and (ii) the initial time-adjusted next expected return, a scaled, time-adjusted next expected return; and computing a sum of (i) the reward included in the transition and (ii) the scaled, time-adjusted next expected return.

3. The method of claim 1, wherein determining, from (i) the current value of the scaling term and (ii) the next observation, the scaled temporal difference learning target for the transition further comprises:

processing, using a target instance of the Q neural network and in accordance with target parameter values of the neural network, the next observation and each action in the set of possible actions that can be performed by the agent when interacting with the environment to output the respective Q value for the action that is the estimate of the return that would be received if the agent performed the action in response to the next observation included in the transition.

4. The method of claim 1, wherein determining, from (i) the current value of a scaling term and (ii) the initial Q value, the scaled Q value for the transition comprises:

computing a product of the scaling term and the initial Q value.

5. The method of claim 1, further comprising initializing the current value of the scaling term to one.

6. The method of claim 1, wherein the scaling term is of form $\exp(\rho)$, where $\rho$ is a trainable parameter.

7. The method of claim 1, wherein determining, based on computing the gradient of the error with respect to the Q network parameters, the update to the current values of the Q network parameters comprises:

adding a ranking regularization term to the error, wherein the ranking regularization term depends on a maximum among (i) a constant plus a difference between (a) the initial Q value for the transition and (b) a Q value generated by processing the current observation and a remaining action in the set of possible actions that is different from the action included in the transition in accordance with current values of the Q network parameters and (ii) zero; and determining, based on computing a gradient of the ranking regularization term and the error with respect to the Q network parameters, the update to the current values of the Q network parameters.

8. The method of claim 7, further comprising adding the ranking regularization term to the error according to a filtering scheme which determines whether the ranking regularization term should be added to the error based on the reward included in the transition.

9. The method of claim 1, wherein determining, based on computing the gradient of the error with respect to one or more scaling term parameters, the update to the current value of the scaling term comprises:

adding a scaling term regularization term to the error, wherein the scaling term regularization term depends on a difference between (i) the scaled Q value for the transition and (ii) a time-adjusted sum of respective rewards included in one or more subsequent transitions to the transition in the plurality of transitions selected from the replay memory; and determining, based on computing a gradient of the scaling term regularization term and the error with respect to the one or more scaling term parameters, the update to the current value of the scaling term.

10. The method of claim 1, wherein:

determining the update to the current values of the Q network parameters further comprises determining a value for a Q network parameter learning rate; and determining the update to the current value of the scaling term further comprises determining a value for a scaling term learning rate that is smaller than the value for a Q network parameter learning rate.

11. The method of claim 10, wherein the value of the scaling term learning rate is dependent on a number of the plurality of transitions selected from the replay memory.

12. The method of claim 1, wherein:

each transition in the replay memory further comprises a respective next action performed by the agent in response to the next observation; and training the Q neural network on the plurality of transitions further comprises, for each transition of the plurality of transitions:

processing the current observation and the current action in accordance with current values of the Q network parameters to generate the initial Q value for the transition;

determining, from the next observation and the next action included in the transition, a temporal difference learning target for the transition;

determining an error between the temporal difference learning target and the initial Q value; and determining, based on computing a gradient of the error with respect to the Q network parameters, an update to the current values of the Q network parameters.

13. The method of claim 1, wherein none of the plurality of transitions were generated by controlling the agent using the Q neural network.

14. The method of claim 1, wherein the environment is a real-world environment and the observations are generated by sensors arranged to sense a state of the real-world environment.

15. The method of claim 1, further comprising, after training the Q neural network:

receiving a new observation characterizing a new state of the environment being interacted with by the agent;

processing the new observation using the Q neural network to generate a respective Q value for each action in a set of possible actions that can be performed by the agent in response to the new observation, the Q value for each action being an estimate of a return that would be received if the agent performed the action in response to the new observation;

selecting, from the set of possible actions, an action based on the respective Q values; and causing the agent to perform the selected action.

16. The method of claim 15 wherein the environment is a real world environment, the observations are generated by sensors arranged to sense a state of the real-world environment, and the agent is a robot or an autonomous or semi-autonomous land, air, or sea vehicle navigating through the environment.

17. The method of claim 16 wherein the Q neural network was trained using a simulated environment.

18. A system comprising one or more computers and one or more storage devices storing instructions that when executed by one or more computers cause the one or more computers to perform operations for training a Q neural network having a plurality of Q network parameters and used to select actions performed by a reinforcement learning agent interacting with an environment by performing actions that cause the environment to transition states, the method comprising:

maintaining a replay memory, the replay memory storing a plurality of transitions generated as a result of the reinforcement learning agent interacting with the environment, each transition comprising a respective current observation characterizing a respective current state of the environment, a respective current action performed by the agent in response to the current observation, a respective next observation characterizing a respective next state of the environment, and a reward received in response to the agent performing the current action;

selecting a plurality of transitions from the replay memory; and training the Q neural network on the plurality of transitions, comprising, for each transition of the plurality of transitions:

processing the current observation and the current action in accordance with current values of the Q network parameters to generate an initial Q value for the transition;

determining, from (i) a current value of a scaling term and (ii) the initial Q value, a scaled Q value for the transition;

determining, from (i) the current value of the scaling term and (ii) the next observation included in the transition, a scaled temporal difference learning target for the transition;

determining an error between the scaled temporal difference learning target and the scaled Q value;

determining, based on computing a gradient of the error with respect to the Q network parameters, an update to the current values of the Q network parameters; and determining, based on computing a gradient of the error with respect to one or more scaling term parameters, an update to the current value of the scaling term.

19. The system of claim 18, wherein determining, from (i) the current value of the scaling term and (ii) the next observation, the scaled temporal difference learning target for the transition comprises:

processing, using the Q neural network, the next observation and each action in a set of possible actions that can be performed by the agent when interacting with the environment to output a respective Q value for the action that is an estimate of a return that would be received if the agent performed the action in response to the next observation included in the transition;

selecting, from the set of possible actions, a selected action based on the respective Q values;

determining, from a value of a discount factor and the Q value for selected action, an initial time-adjusted next expected return if the selected action is performed in response to the next observation;

determining, from (i) the current value of the scaling term and (ii) the initial time-adjusted next expected return, a scaled, time-adjusted next expected return; and computing a sum of (i) the reward included in the transition and (ii) the scaled, time-adjusted next expected return.

20. The system of claim 18, wherein determining, from (i) the current value of the scaling term and (ii) the next observation, the scaled temporal difference learning target for the transition further comprises:

processing, using a target instance of the Q neural network and in accordance with target parameter values of the neural network, the next observation and each action in the set of possible actions that can be performed by the agent when interacting with the environment to output the respective Q value for the action that is the estimate of the return that would be received if the agent performed the action in response to the next observation included in the transition.

\* \* \* \* \*